United States Patent
Himmelsbach et al.

[11] 3,820,096
[45] June 25, 1974

[54] MECHANO-OPTICAL DIGITAL POSITION-INDICATING SYSTEM WITH VERNIER READING

[75] Inventors: Paul Himmelsbach; Werner Failer, both of Bad Kreuznach, Germany

[73] Assignee: Jos. Schneider & Co., Optische Werke Krueznach, Bad Kreuzmach, Germany

[22] Filed: Apr. 26, 1973

[21] Appl. No.: 354,854

[30] Foreign Application Priority Data
Apr. 28, 1972 Germany............................ 2220934

[52] U.S. Cl............. 340/204, 340/188 R, 340/187, 340/380, 340/336, 116/124 R, 116/129 L, 340/212
[51] Int. Cl... G08c 19/36, G08c 19/30, G08c 23/00
[58] Field of Search.... 340/202, 201 P, 204, 188 R, 340/336, 380; 116/129 L, DIG. 26, DIG. 37, 124 R

[56] References Cited
UNITED STATES PATENTS

| | | | |
|---|---|---|---|
| 2,899,751 | 8/1959 | Mayes............................... | 340/204 |
| 3,103,651 | 9/1963 | Heinecke............................ | 340/190 |
| 3,467,960 | 9/1969 | Hosker............................... | 340/380 |
| 3,644,922 | 2/1972 | James................................ | 340/336 |

*Primary Examiner*—Thomas B. Habecker
*Attorney, Agent, or Firm*—Karl F. Ross; Herbert Dubno

[57] ABSTRACT

A code carrier with several parallel tracks moves past a first reading head which feeds a digital indicator, through several bundles of light-conductive filaments assigned to respective digital positions, in accordance with transparent or reflective code markings on associated tracks of the carrier which is coupled with a measuring bar for joint movement therewith. The code markings on the carrier tracks define a multiplicity of unit steps giving a coarse reading of the measured value. The measuring bar is provided with light-transmissive graduations whose spacing corresponds to the unit steps and which are optically projected onto a receiving surface together with a reference mark from a slider coupled, through a step-down transmission, with a rotatable control disk having several concentric code tracks. The slider, which may be rigid with the first reading head, has a stroke length just short of a unit step so as to give a vernier measurement, in terms of supplemental digits, with the aid of a second reading head which scans the code tracks of the control disk and feeds the digital indicator through additional bundles of light-conductive filaments in accordance with the disk position in which the projected reference mark coincides with one of the graduations of the measuring bar as projected upon the receiving surface.

14 Claims, 2 Drawing Figures

MECHANO-OPTICAL DIGITAL POSITION-INDICATING SYSTEM WITH VERNIER READING

FIELD OF THE INVENTION

Our present invention relates to a position-indicating system adapted to be used for a variety of measurements, e.g. to determine the exact height or thickness of a workpiece.

BACKGROUND OF THE INVENTION

Systems are known which provide a digital readout for the position of a measuring element with the aid of light beams that can be selectively blocked or unblocked to form numerical images. Such systems avoid the errors of observation occurring with analog indicators but, e.g. as noted in U.S. Pat. No. 3,467,960, do not permit interpolation when the measuring element stops between two positions separated by a unit step. The length of such a unit step, i.e. the minimum increment that can be registered by the digital indicator, depends on the available degree of optical resolution which is limited, even with optical magnification, by practical considerations. Thus, a five-digit decadic readout (corresponding to $10^6$ discrete measuring positions) would require a rather complex system of this nature.

OBJECTS OF THE INVENTION

The general object of our present invention is to provide means in a system of the aforementioned type for extending the resulting digital information to fractions of a unit step so as to produce a count not only of a whole number of such unit steps but also of subdivisions (e.g. tenths, hundredths etc.) thereof.

A more specific object is to provide a highly compact yet flexible structure for achieving this aim.

SUMMARY OF THE INVENTION

A digital position-indicating system according to our invention comprises, essentially, a code carrier coupled with the measuring element for joint displacement therewith, this carrier being provided with one or more tracks bearing optically readable (e.g. transparent or reflective) markings which form first code groupings of different patterns at locations separated by one unit step in the direction of carrier displacement. The measuring element is provided with a multiplicity of equispaced optically readable graduations, preferably in the form of a set of parallel lines, one unit step apart; combinations of luminous signals corresponding to these first code groupings are converted into numerical data of progressively changing value in a digital utilization device, such as a decadic display indicator, to which these signals are fed by means of a set of light-conductive filaments extending from a first reader juxtaposed with the carrier. The coupling between the code carrier and the measuring element may be adjustable to facilitate a selective zero setting of the display indicator in different starting positions of that element.

In order to allow for the digital representation of lower-order numerical data of progressively changing value, constituting fractions of a unit step, the system according to our invention additionally comprises an interpolation unit including a control member and a controlled member interconnected through a stepdown transmission. The controlled member bears a reference mark and has a range of displacement substantially equaling the spacing of the graduations of the measuring element, i.e. a range which falls short of that spacing by not more than the minimum fractional value or quantum to be registered (e.g. 1 percent). The control member is provided with one or more tracks of optically readable markings which form second code groupings of different patterns giving rise to combinations of luminous signals picked up by a stationary second reader also connected to the utilization device via a set of light-conductive filaments.

In the preferred embodiment described in detail hereinafter, the control member and the controlled member of the interpolation unit are in the form of a disk and a slider, respectively, coupled to each other through a spiral cam (e.g. a slot) on the disk and a cam follower (e.g. a pin) on the slider.

According to another feature of our invention, the controlled member is rigid with the first reader which is therefore moved together with that member into a position of alignment of its reference mark with the nearest graduation in the direction of decreasing numbers of unit steps. In that case, since the apparatus is always brought into this position of alignment before the final reading is taken, the output of the first reader in nonaligned positions is immaterial so that the code groupings of the carrier need conform to a particular pattern only at locations a unit step apart. They may therefore overlap or fade out at locations other than those which confront the first reader in positions in which the reference mark is aligned with one of the graduations of the measuring element. The number of fractional steps required to reach this position of alignment is communicated by the second reader to the utilization unit where it is registered in digital form together with the number of unit steps supplied by the first reader.

According to a further feature of our invention, the position of alignment between the reference mark on the controlled member and a graduation on the measuring element is determined with the aid of optical means serving for the simultaneous projection of enlarged images of the reference mark and of such a graduation upon a receiving surface. The proper juxtaposition of the two images may be ascertained visually, with manual adjustment of the control member, or photoelectrically with automatic adjustment.

In addition to a visual digital display of integral and fractional numerical values, or in lieu thereof, the system according to our invention may provide an electrical readout for the selective actuation of a multiplicity of signal lamps, switches or other loads in accordance with the combined outputs of the two readers. For this purpose the utilization device may comprise a set of photoelectric transducers, served by the light cables originating at the readers, and a decoder fed by these transducers.

The code carrier co-operating with the first reader, designed to furnish a coarse digital indication, may have a variety of shapes. If its code markings are transparent portions on an opaque background (or vice versa) so as to be scannable by translumination, the carrier should be relatively thin and is therefore advantageously in the form of a flexible endless band led around rollers. In principle, however, it could also be a rigid member such as a rotatable drum or disk, a slidable bar or a swingable plate.

BRIEF DESCRIPTION OF THE DRAWING

The above and other features of our invention will now be described in detail with reference to the accompanying drawing in which.

SPECIFIC DESCRIPTION

Figures 1, 2:
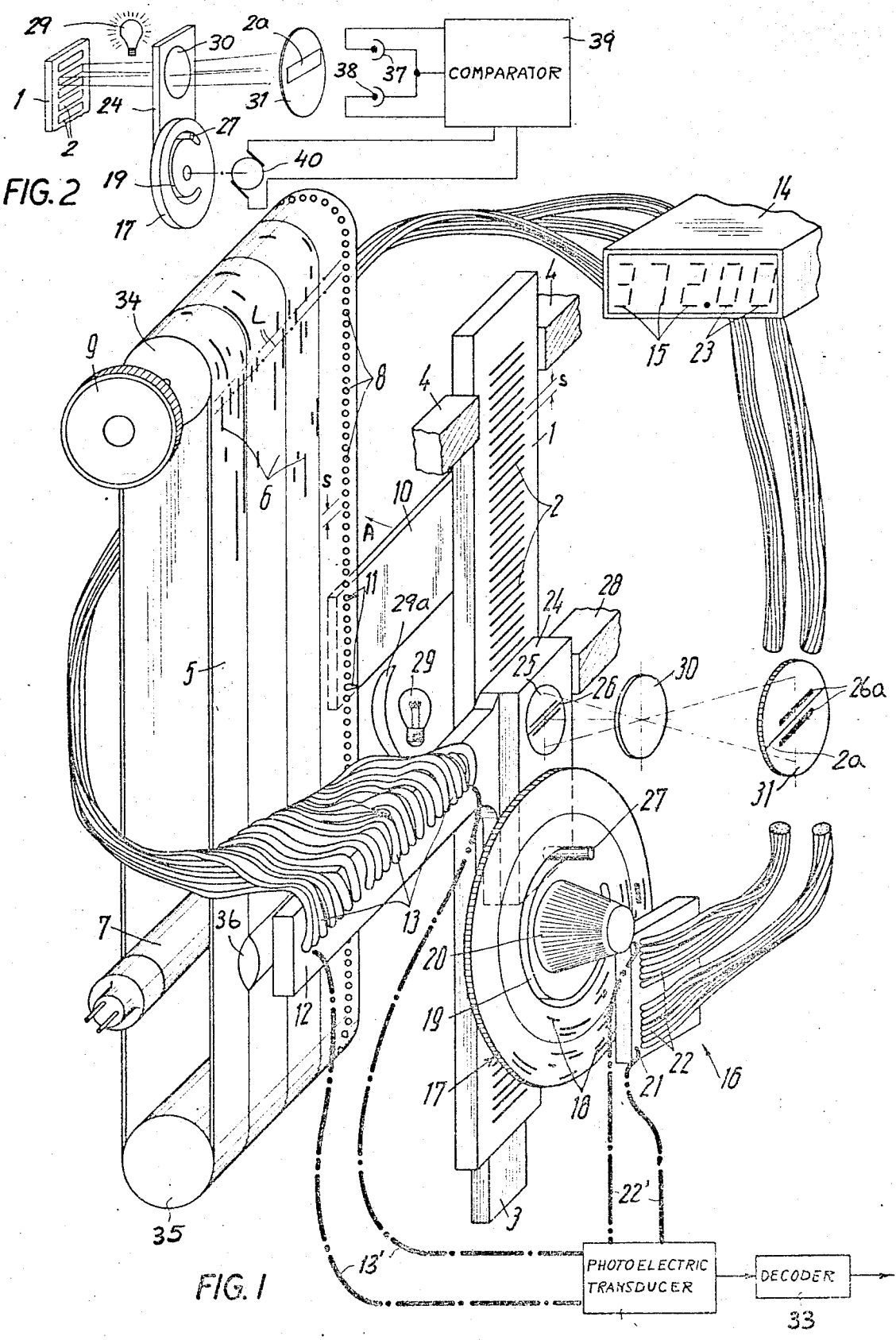
FIG. 1 is a somewhat diagrammatic, perspective view of a system embodying our invention.
FIG. 2 is a diagrammatic detail view of a partial modification of that system.

The system of FIG. 1 comprises a measuring element 1 in the form of a flat bar with a multiplicity of graduations 2 equispaced in its longitudinal (here vertical) direction. The bar 1, slidably guided at 4 in a support forming part of a housing not further illustrated, has a lower extremity 3 designed to engage a workpiece to be measured. A code carrier 5 in the form of an endless band, led around a pair of rollers 34, 35, has its surface divided into several (here three) parallel tracks 6 bearing code markings of the general type described in commonly owned application Ser. No. 263,103 filed 15 June 1972 by one of us, Paul Himmelsbach. Another section of band 5 is formed with a set of equispaced perforations 8 whose spacing s equals that of the graduations 2 and corresponds to a unit step, i.e. to the distance between imaginary transverse lines L along which the code groupings formed by the markings of tracks 6 define different patterns corresponding to 10 distinct combinations of light signals per track. As will become more clearly apparent hereinafter, the configuration of the code pattern is significant only in the immediate vicinity of these imaginary lines; at intermediate locations, therefore, markings may or may not be present anywhere along the tracks so that only a moderate degree of precision is needed for producing the code carrier 5 and some deformation thereof can be tolerated.

Measuring element 1 is linked with band 5 through a flat plate 10 which is hingedly secured to that element and carries at least two pins 11 engageable in any of the perforations 8; to vary the coupling between element 1 and code carrier 5, the link 10 is swung rearwardly (arrow A) to disengage the pins 11 from the perforations 8 whereupon the band 5 may be manually rotated by a knob 9 for the purpose of establishing a different zero position.

An elongate light source 7, here shown as a neon lamp, is disposed between the two runs of band 5 for transluminating a section of its surface confronting a first reading head 12 from which a set of light-conductive filaments 13 extend in three cables, one for each track section, to a visual display indicator 14 having three digital positions 15 to the left of a decimal point and two digital positions 23 to the right thereof. The various digits from 0 through 9 can be generated in stylized form by a maximum of seven short strokes, as disclosed in the aforementioned U.S. Pat. No. 3,467,960. Thus, a total of 21 filaments 13 is required for a coarse reading of position in terms of an integral number of linear units; if these units are millimeters, the measuring range is one meter.

An interpolation unit 16 comprises a control disk 17 with two concentric code tracks 18 and with a camming slot 19. Disk 17 is manually rotatable, with the aid of a knob 20, on a fixed support rigid with the nonillustrated instrument housing. Code tracks 18 confront an immobile second reader 21 connected with display unit 14 via light-conductive filaments 22 forming two cables of seven conductors each. The code markings on tracks 18, which are transluminated by a light source not shown, extend over a major part of the disk surface (equal in arc length to camming slot 19) and form groupings whose patterns change in one-hundred fractional steps, thereby giving readings from 00 through 99 in display section 23.

Slot 19 is penetrated by a pin 27 rigid with a slider 24 which is integral with reading head 12 and is guided for vertical movement in front of measuring bar 1. Slider 24 has a transparent portion 25 for the passage of light rays from a lamp 29, provided with a reflector 29a, around the graduations 2 which form dark lines on the otherwise transparent body of bar 1. A reference mark 26 on window 25 is projectable, via an objective 30, onto a ground-glass plate 31 forming a receiving surface for the image 2a of graduation 2 and for the image 26a of reference mark 26 which here consists of two closely spaced horizontal lines. Objective 30 enlarges the projected images sufficiently so as not to let more than one line image 2a at a time fall upon the receiving surface. The pitch of spiral 19 on disk 17 is so chosen that slider 24 rises by a distance $0.99s$ upon a full rotation of disk 17 from its illustrated position, in which the pin 27 engages one end of slot 19, to its other limiting position in which the pin bears upon the opposite slot end. If a projected line image 2a is not exactly bracketed between the lines of reference image 26a, disk 17 is rotated until such bracketing is observed. The angular distance between the illustrated starting position and this position of alignment is translated by reading head 21 into a selective illumination of its light conductors 22 to provide a fine or vernier indication of the measuring position in the form of digits 23 displayed by device 14. In the starting position, this vernier reading is 0.00.

Thus, the display indicator 14 registers one-million discrete measuring positions ranging from 000.00 through 999.99. Under the conditions assumed above, the quantum of measurement is 0.01 mm.

If desired, the projections of the code markings from tracks 6 upon reading head 12 may be magnified in the direction of carrier motion by interposition of anamorphotic means, schematically illustrated as a cylindrical lens 36, between the band 5 and the reading head. Similar anamorphotic means may be inserted between tracks 18 and reading head 21 to magnify the code markings thereof in the direction of track motion. This enables the use of several superposed light conductors for each bit of a code combination without loss of resolution.

The use of flexible filaments as light conductors between the measuring instrument proper and the associated display indicator 15 allows the latter to be moved freely to different locations outside the instrument housing.

As further illustrated in FIG. 1, additional light cables 13', 22' may extend to a set of photoelectric transducers 32 working into a decoder 33 for the selective control of a multiplicity of loads not shown. The simultaneous present of display indicator 14 and converter 32, 33 enables the visual monitoring of the actuated loads. Bar 1, in such a case, might be progressively shifted by an automatic selector for the sequential energization of all or some of these loads. Recording equipment may be connected to transducers 32, directly or by way of decoder 33, for storing the measured values. Transducers 32 can also feed monitoring lamps mounted on reading heads 12, 21.

In FIG. 2 we have illustrated the possibility of driving the disk 17 by automatic means in order to establish a position of alignment between a line image 2a and a reference mark which in this case is the axis or objective 30 carried on slider 24 in place of window 25. Bar 1 is here made of nonreflecting material, with reflective graduations 2, and is episcopically illuminated by the lamp 29. The image 2a of a graduation falling upon ground-glass plate 31 is detected by two symmetrically positioned photocells 37, 38 which have identical outputs when that image is centered with reference thereto, i.e. when the corresponding gratuation 2 is aligned with the axis of objective 30. A comparator 39 responds to any difference in the photocell output to energize a reversible motor 40 driving the disk 17 in a sense establishing the alignment position. To insure such operation, the receiving surface of plate 31 should be large enough to intercept the rays of a graduation 2 in any relative position of bar 1 and slider 24.

The several light sources used to transluminate the code markings of tracks 6, 18 and the graduations 2, such as lamps 7 and 29, may be replaced by light-conducting filaments illuminated from a single light source. Translumination may be replaced in all instances by episcopic lighting, as shown in FIG. 2 for the bar 1. The cam coupling 19, 27 between disk 17 and slider 24 is representative of any positively acting step-down transmission and may be replaced, for example, by a gear coupling or a rack-and-pinion drive.

I claim:

1. A mechano-optical position-indicating system comprising:

a measuring element displaceably mounted on a support and provided with a multiplicity of equispaced optically readable graduations one unit step apart;

a code carrier coupled with said measuring element for joint displacement therewith, said carrier being provided with at least one first track bearing optically readable first markings which form first code groupings of different patterns at locations separated by a unit step in the direction of displacement of said carrier;

first reading means juxtaposed with said carrier for picking up combinations of luminous signals corresponding to said first code groupings;

digital utilization means connected to said first reading means via a first set of light-conductive filaments for receiving therefrom said first luminous signals and converting same into first numerical data of progressively changing value;

an interpolation unit including a control member and a controlled member interconnected through a step-down transmission, said controlled member bearing a reference mark and having a range of displacement parallel to the motion of said bearing element over a range substantially equaling the spacing of said graduations for establishing a position of alignment of said reference mark with one of said graduations in any measuring position of said element, said control member being provided with at least one second track bearing optically readable second markings forming second code groupings of different patterns; and stationary second reading means in said interpolation unit juxtaposed with said control member for selective alignment with said second code groupings in different operating positions of said control member, said second reading means being connected to said digital utilization means via a second set of light-conductive filaments for transmitting thereto combinations of luminous signals corresponding to said second code groupings for conversion into second numerical data of progressively changing value of an order of magnitude lower than that of said first numerical data.

2. A system as defined in claim 1, comprising adjustable coupling means between said measuring element and said code carrier.

3. A system as defined in claim 1 wherein said control member is a disk and said controlled member is a slider.

4. A system as defined in claim 3 wherein said disk is provided with a spiral cam, said step-down transmission comprising a cam follower on said slider engaging said spiral cam.

5. A system as defined in claim 1 wherein said controlled member is rigid with said first reading means.

6. A system as defined in claim 1, further comprising optical means for simultaneously projecting enlarged images of said reference mark and of at least one of said graduations upon a receiving surface to juxtapose said images in said position of alignment.

7. A system as defined in claim 6 wherein said optical means includes a light source and an objective, said reference mark and said graduations forming transparent portions of said controlled member and said measuring element, respectively, said transparent portions being juxtaposed for joint translumination by light rays from said source and focusing of said light rays by said objective upon said receiving surface.

8. A system as defined in claim 6, further comprising photoelectric means confronting said receiving surface for detecting said position of alignment, and drive means for said control member responsive to said photoelectric means for automatically establishing said position of alignment.

9. A system as defined in claim 1 wherein said utilization means comprises a multiposition digital indicator.

10. A system as defined in claim 1 wherein said utilization means comprises a multistage photoelectric transducer and a decoder in the output of said transducer.

11. A system as defined in claim 1 wherein said code carrier comprises an endless band.

12. A system as defined in claim 11 wherein said band is provided with a row of perforations whose spacing equals a unit step, said measuring element being provided with a link having at least one pair of pins releasably engaging in certain of said perforations for entraining said band.

13. A system as defined in claim 1, further comprising optical magnifying means between at least one of said reading means and an associated track.

14. A system as defined in claim 13 wherein said manifying means comprises anamorphotic means having a magnifying effect in the direction of displacement of the associated track.

* * * * *